United States Patent [19]

McElroy

[11] Patent Number: 4,911,229
[45] Date of Patent: Mar. 27, 1990

[54] VALVE SYSTEMS FOR PURGING EARTH COUPLED WATER SOURCE HEAT PUMPS

[76] Inventor: Arthur H. McElroy, 833 N. Fulton, Tulsa, Okla. 74115

[21] Appl. No.: 279,303

[22] Filed: Dec. 1, 1988

Related U.S. Application Data

[62] Division of Ser. No. 893,196, Aug. 4, 1996, abandoned.

[51] Int. Cl.$^4$ .................. F25D 17/02; F24J 3/08
[52] U.S. Cl. .................. 165/45; 165/104.32; 62/238.6; 62/260; 62/238.7; 251/217; 251/215
[58] Field of Search .................. 165/104.32, 45; 62/238.6, 238.7, 260; 251/215, 217

[56] References Cited

U.S. PATENT DOCUMENTS 2,833,512  5/1958  Sanborn .................. 251/215
4,257,239  3/1981  Partin et al. .................. 165/45

Primary Examiner—Albert W. Davis Jr.
Attorney, Agent, or Firm—Head & Johnson

[57] ABSTRACT

A manifold and valve system is disclosed for purging air from a closed brine filled loop piping used in conjunction with a water source heat pump. The valves are T-shaped with a closure member or valving member in the top portion which connects with the purge flow conduit.

5 Claims, 4 Drawing Sheets

VALVE SYSTEMS FOR PURGING EARTH COUPLED WATER SOURCE HEAT PUMPS

This is a divisional of co-pending application Ser. No. 06/893,196 filed on Aug. 4, 1986 now abandoned.

BACKGROUND

The invention is directed to the broad field of apparatus for purging closed fluid piping or other flow systems of air or other corrosive gases. In particular, water source heat pumps of the type where a liquid, for example, water or brine is used to exchange heat to and from a heat pump. Such a heat pump is known in the art and is typical of that utilized for heating and cooling living or working space. A water source heat pump (WSHP) evaporates refrigerant liquid which absorbs heat from water circulating through pipes and a heat exchanger. An electric motor driven compressor pressurizes refrigerant vapor, raising its temperature and delivers it to the condenser coil in the space where heat from condensation is released and transferred to circulating air. A reversing valve changes the flow of refrigerant through the water heat exchanger to change from heating to a cooling cycle.

This invention is directed to a WSHP system wherein the circulating water pipes comprise a sealed closed loop of high strength plastic pipe which is buried in the ground or in communication therewith either through vertical bores and/or horizontal trenches adjacent and-/or surrounding the house or other location being affected. Typically, such a closed loop of piping will consist of as much as four hundred to five hundred feet per ton (of heat pump rating) of piping depending upon the size of the system, the size and type of pipe and the ambient climate conditions.

The problem with such an earth coupled system is in the start-up procedures wherein the piping is to be first filled or thereafter to be refilled. In order to prevent possible freezing most systems use brine as the heat exchange liquid. Thus, because part of the heat exchange system within the heat pump is subject to corrosion, it is necessary to purge the air from the piping system to substantially minimize such corrosion.

SUMMARY OF THE INVENTION

This invention has as its primary object to provide a system for purging air from the circulating water or brine used with a WSHP wherein the water circulates through pipes buried or otherwise in communication with the ground.

Another object of the invention is to provide plastic purge valves connected to the circulating water piping which provides a means to fill the piping with the circulating liquid and to purge substantially all of the air therefrom.

In particular, the invention is directed to a manifold and valve system whose only purpose is for purging air from a closed loop of plastic piping used with a WSHP. In further particular The piping is directly in communication with the ground by being buried therein and/or in communication with the earth via a vertical bore. The piping includes an inlet header and an outlet header connected respectively to the inlet and outlet to and from the WSHP. An inlet purge valve in accordance with this invention and an identical outlet purge valve are connected respectively to the inlet and outlet headers. Each of these valves comprises a cylindrical body having a central cavity that is in communication with each respective header. One end of the cavity is in closable communication with the cavity or with a means to fill and purge the piping. A valve means is provided within the cavity to open and close same as a part of the process of filling and purging the piping.

DETAILED DESCRIPTION

Figure 1:
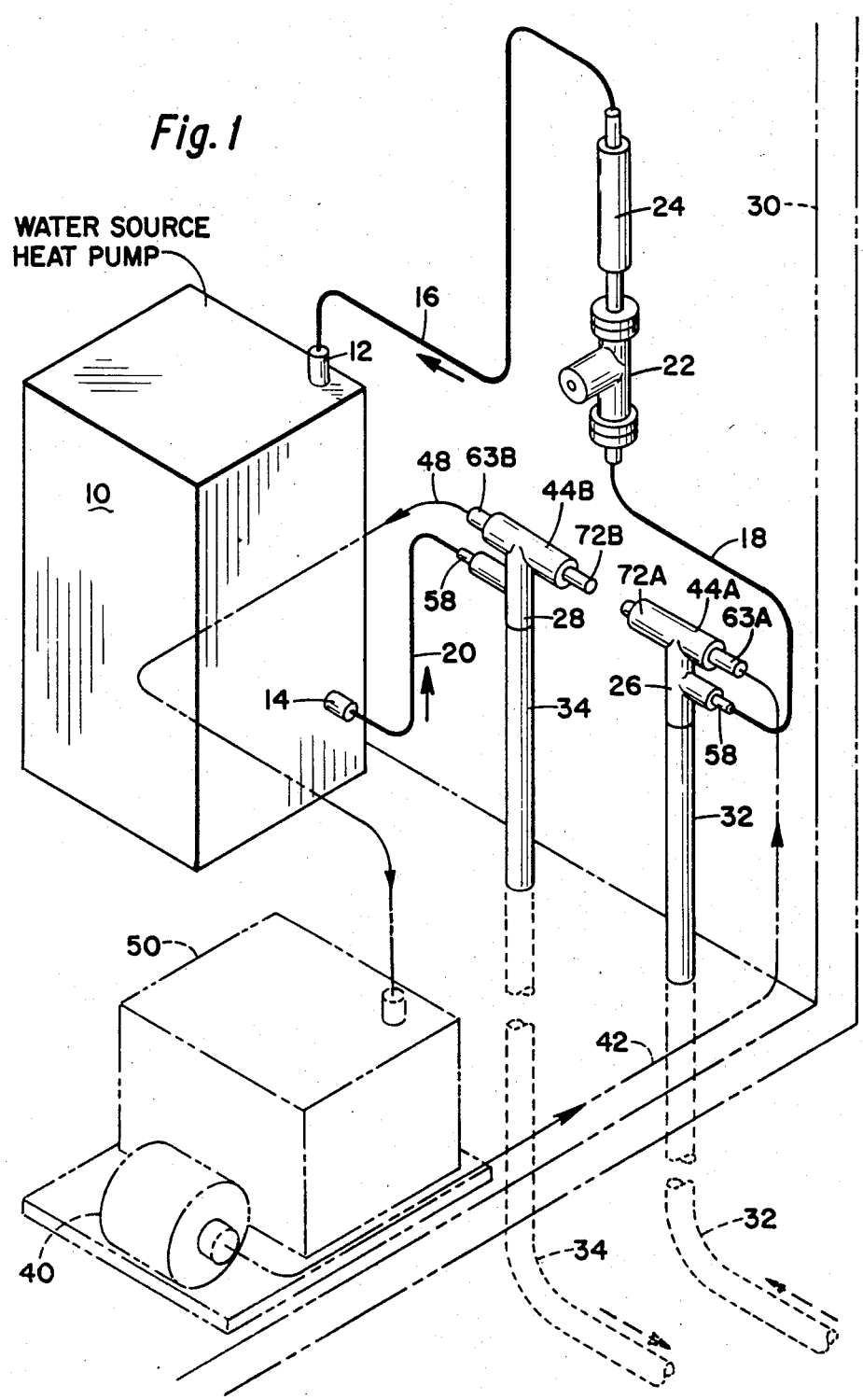
FIG. 1 is a perspective/schematic view describing the invention in combination with a WSHP and a means to fill and purge the circulating liquid piping.

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

A water source heat pump (WSHP) 10 is schematically shown and which normally includes, not shown, a heat exchanger in communication with the refrigerant liquid to deliver heat to and therefrom, by way of an inlet 12 and an outlet 14 connected respectively by way of conduits 16 and 18 on the inlet side and by conduit 20 on the outlet side. Between the inlet lines 16 and 18 is provided a suitable shut-off valve 22, such as the type known as a Grundfos Isolation valve, and an optional flow meter 24. Inlet line 18 is connected to an outlet header 26 while the outlet conduit 20 is connected to an outlet header 28. The system which has been previously described is aptly contained either within the house within which the air is being conditioned or in a suitable contiguous enclosure 30 shown by the dotted lines.

Figures 2, 4:
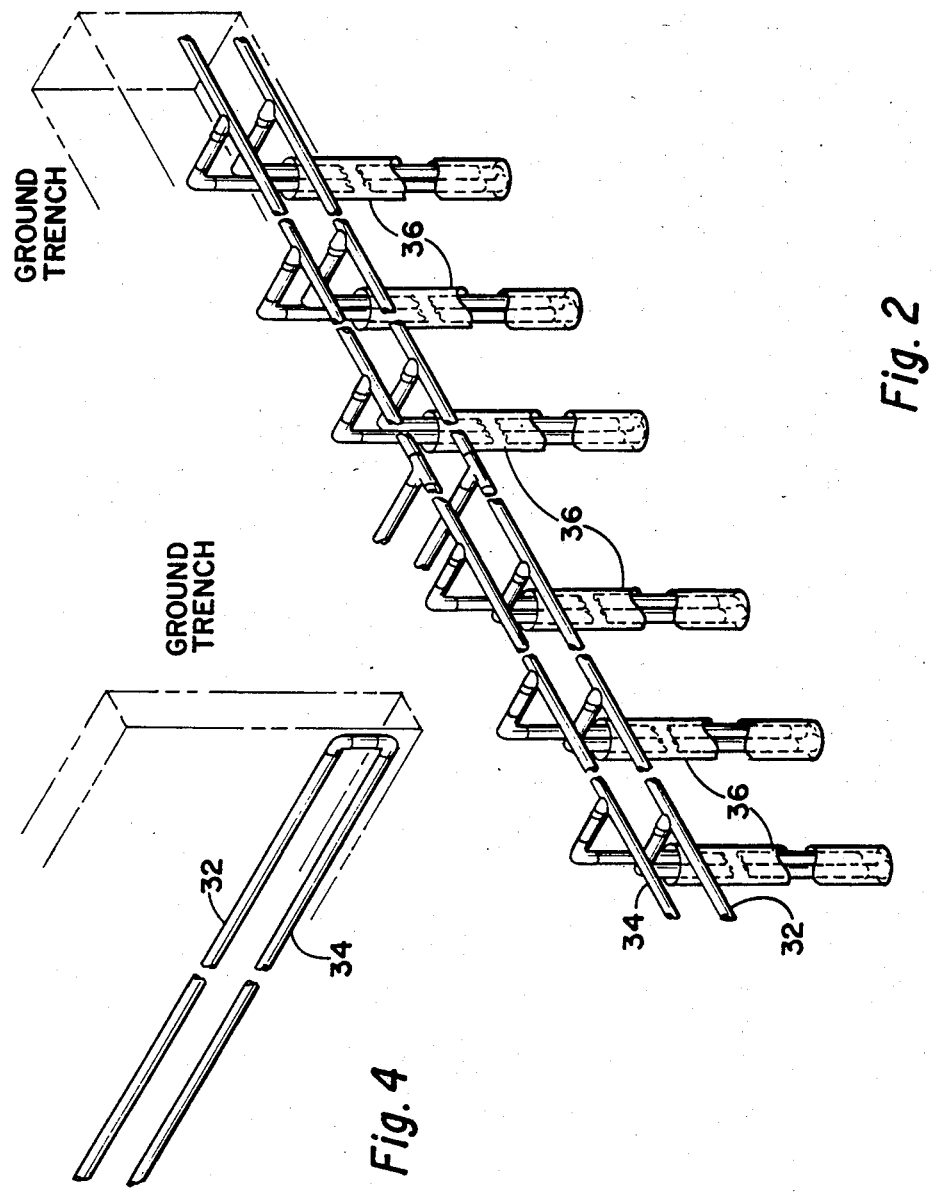
FIGS. 2-4 represent various forms of ground supported and ground communication circulating liquid flow systems used with a WSHP.
Figure 3:
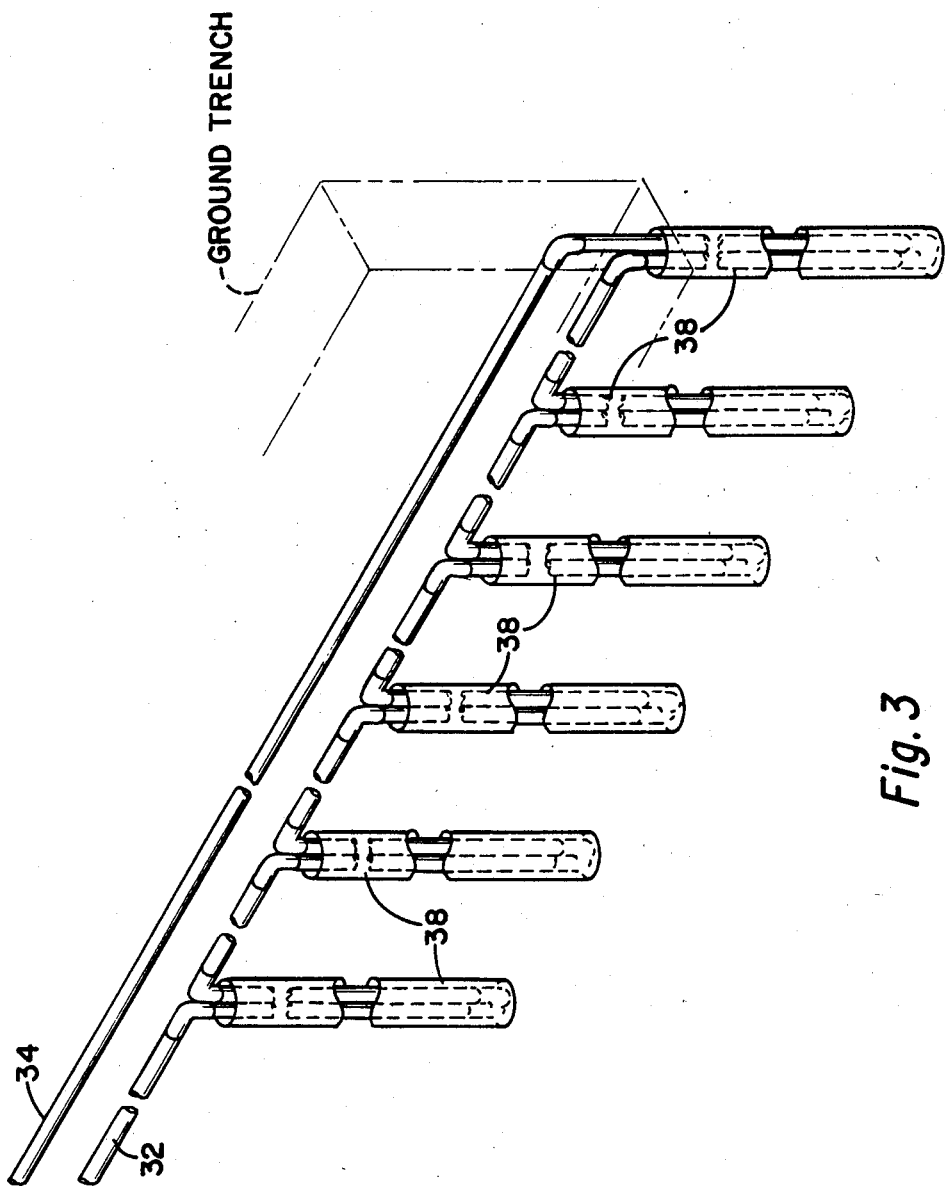

The inlet header 26 is connected to the inlet flow piping 32 while the outlet flow header 28 is connected to the outlet piping 34. Piping 32 and 34 comprise an extensive connected loop of piping or series of piping which are either buried in the ground horizontally as shown in FIG. 4 or are connected in parallel in a plurality of vertical bores 36 which provides communication with the ground temperature, as is described in FIG. 2. FIG. 3 is descriptive of another system using a plurality of vertical bores 38 in the ground wherein the circulating liquid flows in series from the inlet 32 to the outlet 34.

Referring again to FIG. 1 it becomes necessary in the original start up of the circulating liquid system and occasionally for maintenance purposes to fill and purge the circulating flow system encompassing the closed loop piping 32 and 34 and its associated circulating conduits. As shown in FIG. 1 a purge motor and pump 40 delivers liquids via conduit 42 to purge valve 44A to fill the system, including the closed loop or loops 32 and 34, so that the entire conduit system through the heat exchanger of the WSHP is filled with liquid with the excess exiting from purge valve 44B into conduit 48 for return to the supply tank 50.

Figure 5:
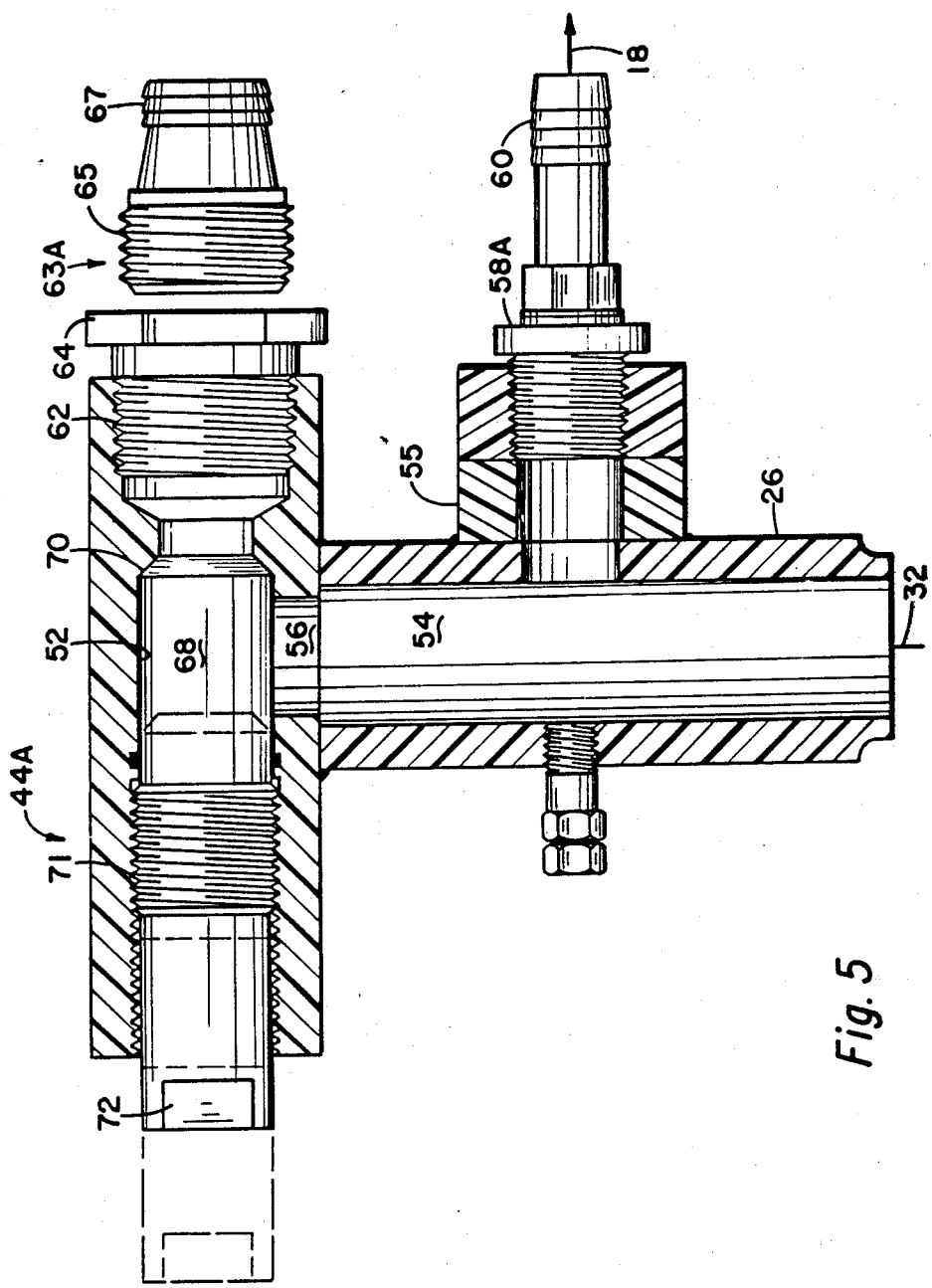
FIG. 5 is a sectional view of the valving and manifold system of the invention.

The purge valves 44A and 44B are identical and best described with reference to FIG. 5. In this FIGURE, header 26, used in this example, is connected to the purge valve 44A and comprises a body having a central cavity 52 which in one position is in communication with the opening 54 and conduit 32 via passageway 56. Normal flow of liquid through the WSHP occurs through threaded sleeve 55 via threaded connectors 58-A and hose connection means 60.

Threads 62 in the purge valve body are adapted to receive the threaded plug 64 or in the alternative, during the fill and purge cycle, a connector 63 having matching threads 65 and hose connections 67. At the other end of the cavity 52 is a valve 68 which is adapted to be rotated on threads 69 to abut against valve seat 70 and thus close passageways 54 and 56. Means are provided at 72 to receive a wrench or other means for rotating the valve body 68 outward to the open position as shown by dotted line.

When it is desired to fill and purge the liquid circulating system, a purge motor and pump 40 and liquid storage are connected to the purge valves 44 and 46 in the manner shown in FIG. 1. Plug 64 of purge valve 44A is removed and replaced by hose connectors 63A and then connected to purge flow line 42. A similar plug is removed from purge valve 44B and replaced by hose connector 63B and then connected to purge flow line 48. Valves 62A and 72B are rotated to open the central cavity 52 of each purge valve. The valve 22 is closed to inhibit flow through the WSHP via flow lines 16, 18 and 20. Motor/pump 40 is started forcing liquid from reservoir 50 via flow line 42 through connector 63A and purge valve 44A into piping 32, thence through the various loops such as shown in FIGS. 2, 3 and 4 and return via piping 34 to purge valve 44B. Because valve 72B is open flow continues out connector 63B into return flow line 48 back to reservoir 50. Once the operator is satisfied that the piping and connected loops are filled and purged of air, valve 22 is opened to permit flow via lines 18, 16 and 20 to fill and purge the heat transfer tubing directly connected in the WSHP system. Again once the operator is satisfied that the system is filled and purged of air the motor/pump is shut down.

Valves 72A and 72B are closed. Respective hoses connectors 42/63A, and 48/63B are removed and replaced by plugs 64 in each purge valve. At this point the WSHP system becomes operational.

The invention is particularly adaptable to the use of polyolefin pipe used in the various ground loop circulating liquid system, fittings, connection and purge valves. This is to include PE 3408 polyethylene Although the invention has been described with particular reference to the water/brine source type heat pump, the valve 44 is applicable to other flow systems handling corrosive liquids.

What is claimed is:

1. A manifold and valve system for purging air from closed loop piping used with a water source heat pump, said piping having an inlet header and an outlet header connected respectively to an inlet and outlet to and from said water source heat pump, a closed loop purge flow conduit and pump, an inlet purge valve and an outlet purge valve connected respectively to said inlet and outlet headers, each of said valves comprising, a body having a vertical conduit, in communication with each said respective header, and a transverse conduit in communication with said vertical conduit, means at one end of said transverse conduit to selectively connect with said purge flow conduit to fill said closed loop piping, and a valve means at the other end of said transverse conduit to open and close the communication between said transverse conduit and said vertical conduit. are made of plastic.

2. A system of claim 1 wherein said closed loop piping is buried in the ground or otherwise coupled thereto.

3. A system of claim 1 wherein said closed loop piping and said purge valves are made of plastic.

4. A system of claim 3 wherein said plastic is a polyolefin.

5. A system of claim 4 wherein said polyolefin is polyethylene.

* * * * *